(12) United States Patent
Piccoli et al.

(10) Patent No.: US 12,118,807 B2
(45) Date of Patent: Oct. 15, 2024

(54) APPARATUS AND METHOD FOR THREE-DIMENSIONAL OBJECT RECOGNITION

(71) Applicant: SiteSee Pty Ltd, Queensland (AU)

(72) Inventors: Lucio Piccoli, Queensland (AU); Laurie Opperman, Queensland (AU); Patrick Mahoney, Queensland (AU)

(73) Assignee: SITESEE PTY LTD, Queensland (AU)

( * ) Notice: Subject to any disclaimer, the term of this patent is extended or adjusted under 35 U.S.C. 154(b) by 473 days.

(21) Appl. No.: 17/280,841

(22) PCT Filed: Sep. 28, 2019

(86) PCT No.: PCT/AU2019/051054
§ 371 (c)(1),
(2) Date: Mar. 26, 2021

(87) PCT Pub. No.: WO2020/061648
PCT Pub. Date: Apr. 2, 2020

(65) Prior Publication Data
US 2022/0004740 A1    Jan. 6, 2022

(30) Foreign Application Priority Data

Sep. 26, 2018    (AU) ................................ 2018903633

(51) Int. Cl.
*G06V 20/64*      (2022.01)
*G06F 18/214*    (2023.01)
(Continued)

(52) U.S. Cl.
CPC .......... *G06V 20/653* (2022.01); *G06F 18/214* (2023.01); *G06T 7/11* (2017.01);
(Continued)

(58) Field of Classification Search
CPC .... G06V 20/653; G06V 20/176; G06V 10/82; G06V 2201/12; G06V 20/647;
(Continued)

(56) References Cited

U.S. PATENT DOCUMENTS 8,078,436 B2    12/2011  Pershing et al.
10,679,338 B2 *  6/2020  Gros ....................... G06T 17/00
(Continued)

FOREIGN PATENT DOCUMENTS

WO    2017127711 A1    7/2017
WO    2019040190 A1    2/2019

OTHER PUBLICATIONS

International Search Report and Written Opinion for International Application No. PCT/AU2019/051054, entitled Apparatus and Method for Three-Dimensional Object Recognition, consisting of 3 pages. Date Mailed: Nov. 19, 2019.
(Continued)

*Primary Examiner* — Bobbak Safaipour
(74) *Attorney, Agent, or Firm* — Hamilton, Brook, Smith & Reynolds, P.C.

(57) ABSTRACT

The present application relates to a method for recognising at least one object in a three-dimensional scene, the method including, in an electronic processing device: determining a plurality of two-dimensional images of the scene, the images at least partially including the at least one object; determining a plurality of two-dimensional segmentations of the at least one object, the two-dimensional segmentations corresponding to the two dimensional images; generating a three-dimensional representation of the scene using the images; generating a mapping indicative of a correspondence between the images and the representation; and using
(Continued)

the mapping to map the plurality of segmentations to the three dimensional representation, to thereby recognise the at least one object in the scene.

19 Claims, 9 Drawing Sheets

(51) Int. Cl.
*G06T 7/11* (2017.01)
*G06T 7/174* (2017.01)
*G06T 7/70* (2017.01)
*G06T 17/20* (2006.01)
*G06V 20/10* (2022.01)

(52) U.S. Cl.
CPC ............... *G06T 7/174* (2017.01); *G06T 7/70* (2017.01); *G06T 17/20* (2013.01); *G06V 20/176* (2022.01); *G06T 2207/10032* (2013.01); *G06T 2207/20081* (2013.01); *G06T 2207/20084* (2013.01); *G06T 2207/30184* (2013.01)

(58) Field of Classification Search
CPC ...... G06V 20/00; G06V 20/20; G06F 18/214; G06T 7/11; G06T 7/174; G06T 7/70; G06T 17/20; G06T 2207/10032; G06T 2207/20081; G06T 2207/20084; G06T 2207/30184; G06T 15/04; G06T 17/00; G06T 7/75; G06T 7/97; G06T 2207/20112; G06T 2207/30244
See application file for complete search history.

(56) References Cited

U.S. PATENT DOCUMENTS

| | | | |
|---|---|---|---|
| 11,055,910 B1* | 7/2021 | Deng | G06V 20/647 |
| 11,620,800 B2* | 4/2023 | Sardari | G06T 19/20 345/419 |
| 2009/0110267 A1* | 4/2009 | Zakhor | G06T 7/75 382/154 |
| 2017/0161590 A1* | 6/2017 | Boulkenafed | G06F 18/24143 |
| 2017/0220887 A1 | 8/2017 | Faithi et al. | |
| 2019/0051056 A1* | 2/2019 | Chiu | G06F 16/903 |
| 2019/0239838 A1* | 8/2019 | Barak | G06T 7/30 |
| 2020/0265607 A1* | 8/2020 | Lev | G06T 7/73 |
| 2020/0320327 A1* | 10/2020 | Fathi | G06V 20/70 |
| 2021/0004984 A1* | 1/2021 | Ji | G06T 7/11 |
| 2021/0027532 A1* | 1/2021 | Lin | G06T 17/05 |
| 2022/0076448 A1* | 3/2022 | Liu | G06T 3/4038 |
| 2023/0148865 A1* | 5/2023 | Rivlin | A61B 5/0064 348/48 |

OTHER PUBLICATIONS

Máthé, K. et al., "Vision and Control for UAVs: A Survey of General Methods and of Inexpensive Platforms for Infrastructure Inspection," Sensors, vol. 15, pp. 14887-14916 (2015).

* cited by examiner

APPARATUS AND METHOD FOR THREE-DIMENSIONAL OBJECT RECOGNITION

This application is the U.S. National Stage of International Application No. PCT/AU2019/051054, filed on Sep. 28, 2019, which designates the U.S., published in English, and claims priority under 35 U.S.C. § 119 or 365(c) to Australia Application No. 2018903633, filed on Sep. 26, 2018. The entire teachings of the above applications are incorporated herein by reference.

FIELD OF THE INVENTION

This invention relates generally an apparatus, method and system for three-dimensional object recognition, and in particular, three-dimensional object recognition using a plurality of two-dimensional images.

BACKGROUND OF THE INVENTION

Understanding physical infrastructure assets is typically very difficult. In many circumstances, infrastructure assets are large and complex, and can be particularly remote from population centers and/or dangerous for people to approach.

Organisations, however, typically desire such infrastructure assets to be audited and/or inspected. This can be particularly useful in determining whether maintenance is required, the type of repair needed, as well as simply ascertaining the status of an asset.

Typically physical infrastructure asset audits are conducted manually. This includes requiring a person to physically attend the infrastructure site, and manually record measurements, inspect and document asset status and condition. This can lead to errors in accuracy, and in addition in some instances it may simply not be possible for a person to record the requisite information (for example, if a measurement is required to be taken at a significant height, in dangerous weather conditions or the like).

SUMMARY OF THE INVENTION

The object of the present invention is to substantially overcome, or at least ameliorate, one or more disadvantages of existing arrangement and/or provide a workable alternative.

In a first broad form, the present invention seeks to provide a method for recognising at least one object in a three-dimensional scene, the method including, in an electronic processing device:
 determining a plurality of two-dimensional images of the scene, the images at least partially including the at least one object;
 determining a plurality of two-dimensional segmentations of the at least one object, the two-dimensional segmentations corresponding to the two-dimensional images;
 generating a three-dimensional representation of the scene using the images;
 generating a mapping indicative of a correspondence between the images and the representation; and
 using the mapping to map the plurality of segmentations to the three-dimensional representation, to thereby recognise the at least one object in the scene.

In one embodiment, the method includes, in an electronic processing device:
 determining a pose estimation for each of the two-dimensional images;
 generating a plurality of two-dimensional representations of the three-dimensional representation using the pose estimations, each two-dimensional representation corresponding to a respective two-dimensional image; and,
 generating the mapping using the two-dimensional representations.

In one embodiment, generating the plurality of two-dimensional representations includes generating a raster render of the three-dimensional representation at each of the plurality of pose estimations.

In one embodiment, the three-dimensional representation includes a mesh.

In one embodiment, the mesh includes a plurality of vertices and a plurality of faces.

In one embodiment, the method includes, in an electronic processing device:
 determining a plurality of face references indicative of the correspondence between each two-dimensional representation and respective faces of the rendered three-dimensional representation; and,
 generating the mapping using the face references.

In one embodiment, the plurality of images of the scene are captured at a plurality of poses In one embodiment, the plurality of images includes at least two adjacent images captured at different poses, both of the adjacent images being at least partially indicative of the same portion of the scene.

In one embodiment, the plurality of images includes a plurality of adjacent images.

In one embodiment, the plurality of images includes adjacent images indicative of a plurality of views of the at least one object.

In one embodiment, the method includes capturing the two-dimensional images using an image capture device.

In one embodiment, the image capture device includes an unmanned aerial vehicle

In one embodiment, the three-dimensional representation includes a three-dimensional reality model.

In one embodiment, the at least one object includes at least one of:
 equipment;
 an antenna;
 non-antenna equipment;
 a cellular phone tower;
 ground; and
 a building.

In one embodiment, the method includes, in an electronic processing device, generating a three-dimensional segmentation of the three-dimensional representation using the mapping and the two-dimensional segmentations.

In one embodiment, the segmentation includes of a probability that each pixel in the corresponding two-dimensional image is indicative of the object.

In one embodiment, the scene includes at least two objects, and the segmentation at least two probabilities per pixel, each probability corresponding to a respective object.

In one embodiment, the method includes, in an electronic processing device:
 determining at least one object parameter; and,
 recognising the at least one object in the scene using the at least one object parameter.

In one embodiment, the at least one object parameter is indicative of at least one of:
 a position of the object;
 an orientation of the object;
 a size of the object;

connectivity of objects; and,
a distance between objects.

In one embodiment, the segmentation includes at least one of supervised segmentation, unsupervised segmentation, and semi-supervised segmentation.

In one embodiment, the method includes, in an electronic processing device, performing the segmentation using a supervised segmentation algorithm.

In one embodiment, the supervised segmentation algorithm includes a neural network.

In one embodiment, the supervised segmentation algorithm includes a convolution neural network (CNN).

In one embodiment, the method includes, in an electronic processing device, training the segmentation algorithm.

In one embodiment, the method includes, in an electronic processing device:
  determining a plurality of two-dimensional training images of a training scene, the training images at least partially including at least one training object, wherein the training object is indicative of the at least one object;
  determining a plurality of training pose estimations corresponding to each of the two-dimensional training images;
  generating a three-dimensional training representation of the training scene using the images;
  segmenting the three-dimensional training representation to recognise the training object;
  generating a plurality of two-dimensional segmented representations of the three-dimensional segmentation; and,
  training the segmentation algorithm using the plurality of two-dimensional images and segmented representations.

In one embodiment, the method includes, in an electronic processing device:
  generating a three-dimensional mesh of the at least one object using the mapping, the two-dimensional segmentations and the three-dimensional representation.

In one embodiment, the method includes, in an electronic processing device post-processing the three-dimensional mesh.

In a second broad form, the present invention seeks to provide a method for training a supervised segmentation algorithm for recognising at least one object in a scene, the method including, in an electronic processing device:
  determining a plurality of two-dimensional training images of a training scene, the training images at least partially including at least one training object, wherein the training object is indicative of the at least one object;
  determining a plurality of training pose estimations corresponding to each of the two-dimensional training images;
  generating a three-dimensional training representation of the training scene using the images;
  segmenting the three-dimensional training representation to recognise the training object;
  generating a plurality of two-dimensional segmented representations of the three-dimensional segmentation; and,
  training the segmentation algorithm using the plurality of two-dimensional images and segmented representations.

In a third broad form, the present invention seeks to provide an apparatus for recognising at least one object in a three-dimensional scene, the apparatus including an electronic processing device that:
  determines a plurality of two-dimensional images of the scene, the images at least partially including the at least one object;
  determines a plurality of two-dimensional segmentations of the at least one object, the two-dimensional segmentations corresponding to the two-dimensional images;
  generates a three-dimensional representation of the scene using the images;
  generates a mapping indicative of a correspondence between the images and the representation; and
  uses the mapping to map the plurality of segmentations to the three-dimensional representation, to thereby recognise the at least one object in the scene.

In a fourth broad form, the present invention seeks to provide an object recognition system for recognising at least one object in a three-dimensional scene, the system including:
  at least one image capture device for capturing a plurality of two-dimensional images; and,
  an electronic processing device that:
    determines a plurality of two-dimensional images of the scene, the images at least partially including the at least one object;
    determines a plurality of two-dimensional segmentations of the at least one object, the two-dimensional segmentations corresponding to the two-dimensional images;
    generates a three-dimensional representation of the scene using the images;
    generates a mapping indicative of a correspondence between the images and the representation; and
    uses the mapping to map the plurality of segmentations to the three-dimensional representation, to thereby recognise the at least one object in the scene.

BRIEF DESCRIPTION OF THE DRAWINGS

An example of the present invention will now be described with reference to the accompanying drawings, in which.

DETAILED DESCRIPTION OF THE INVENTION

Figure 1:
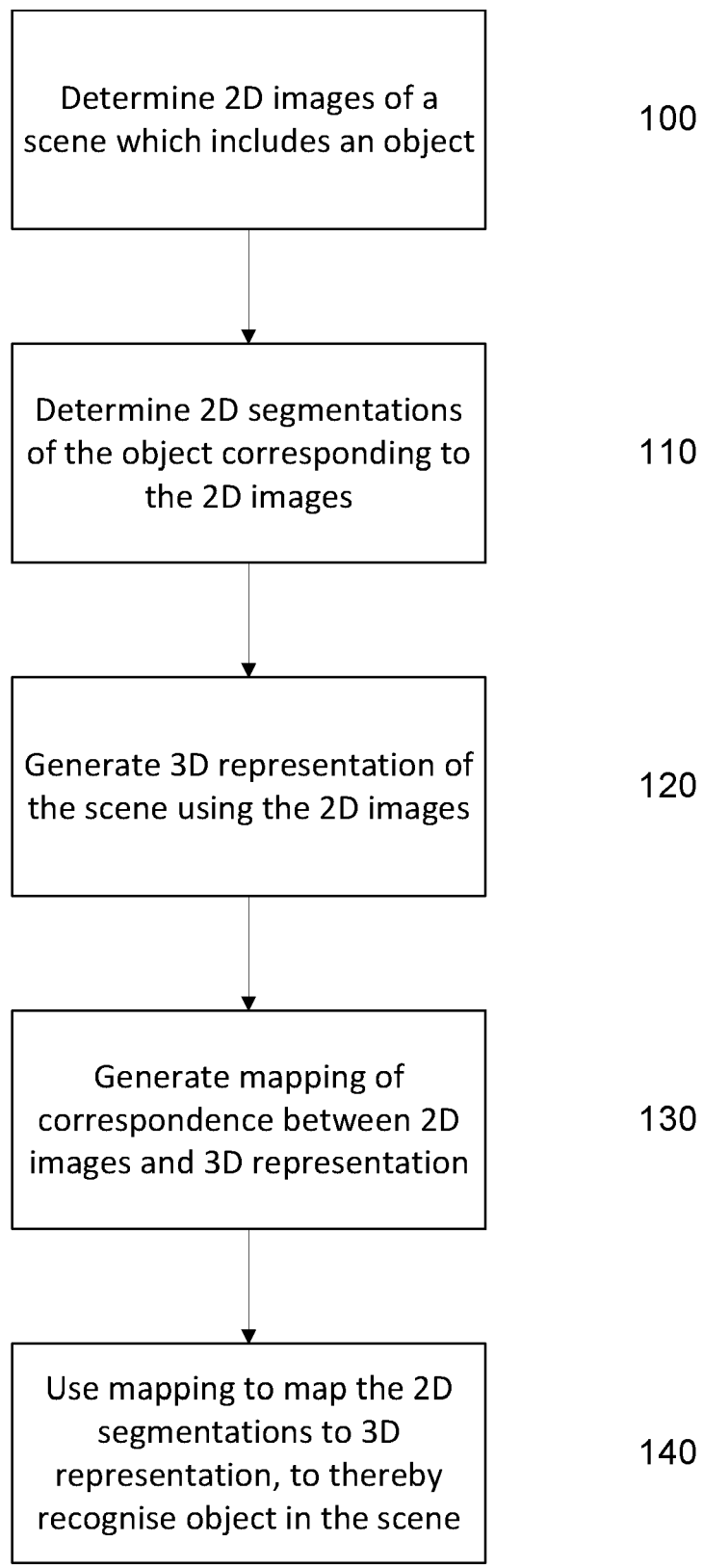
FIG. 1 is a flowchart of an first example of a method for recognising at least one object in a three-dimensional scene.

An example of a method for recognizing one or more objects in a three-dimensional scene will now be described with reference to FIGS. 1-2.

For the purpose of illustration, it is assumed that the following method/processes are performed at least in part using one or more electronic processing devices forming part of one or more processing systems 200, an example of which will be described in more detail below in respect of FIG. 2.

At step 100, the method includes determining a plurality of two-dimensional images of the scene, the images at least partially including the objects.

Reference to an "object" is not intended to be limiting, and while some examples herein describe objects such as equipment, cellular phone towers, antenna and the like, an object can include any "feature" of interest in the scene. For example, in some instances the feature of interest to be recognized may include the ground, a building, or the like, as will be described further below. In addition, reference to the "scene" includes any three dimensional or real-world place or collection of features. In some examples, this can include physical infrastructure, and infrastructure site, or the like, however this is not essential.

Moreover, determining the two-dimensional images may be achieved in any suitable manner, including capturing the images such as using an image capture device (e.g. camera). Additionally, "determining" may refer to accessing from a store, requesting from a remote electronic processing device, or the like, and this will be described in further detail below.

At step 110, a plurality of two-dimensional segmentations of the one or more objects are determined, where the two-dimensional segmentations correspond to the two-dimensional images. Each segmentation includes, for example, a partitioning indicating the region(s) (if any) within each image that include the object. In some instances, this may be achieved by a binary mask (e.g. indicating at which pixels the object is present or not present), a set of contours or curves (e.g. which delineate edges of the object(s)), or the like. As will be appreciated, any suitable method of segmenting the object(s) from the two-dimensional images may be used, including using one or more of supervised, unsupervised or semi-supervised segmentation, and this will be described further below.

At step 120, the method includes generating a three-dimensional representation of the scene using the images. While this may be performed in any suitable manner, in one example this includes using photogrammetry to estimate three-dimensional information (measurements, structure, space, etc) from the images, and using the information to generate the three-dimensional representation. The representation may be of any appropriate form, such as, a three-dimensional computer model, mesh, reality model or the like.

At step 130, the method includes generating a mapping indicative of a correspondence between the images and the representation. In this regard, the mapping is typically indicative of the correspondence between image locations (e.g. pixels) and locations on the representation (e.g. faces of a mesh). This may be achieved in any suitable manner, and in one particular example includes raster rendering a three-dimensional representation at poses which are estimated from the two-dimensional images. That is, the renders are computed at a position and orientation from the model which attempts to approximate the position and orientation at which the images were captured. Using rasterization in this step can be particularly beneficial in speeding up the computational processing time.

At step 140, the method includes using the mapping to map the plurality of segmentations to the three-dimensional representation, to thereby recognise the at least one object in the scene.

Advantageously, the above provides an optimization on techniques such as three-dimensional segmentation of a three-dimensional dataset, which can be particularly computationally intensive. By decreasing computation time, the method becomes particularly amenable to applications which require real-time or near real-time delineation of objects or features of interest from a three-dimensional site or scene.

Moreover, utilizing fewer computational resources allows the technique to be used in a wider range of applications, for example, the survey and audit of physical infrastructure sites. In this regard, computational efficiency means surveys can be conducted remotely, without the need highly specified computational devices or significant energy consumption. Instead, for example, a surveyor may attend a site with a handheld device, and an image capture device, and conduct a three-dimensional audit of objects/features of interest at the site—accurately, consistently and with lower occupational health and safety risk.

A number of further features will now be described.

In one example, the method includes, in an electronic processing device determining a pose estimation for each of the two-dimensional images, generating a plurality of two-dimensional representations of the three-dimensional representation using the pose estimations, each two-dimensional representation corresponding to a respective two-dimensional image, and generating the mapping using the two-dimensional representations. Accordingly, the correspondence between the two-dimensional representations and two-dimensional images provides the mapping between the scene and the three-dimensional representation. This is advantageous, as it allows two-dimensional segmentations to be applied to the three-dimensional representation via the mapping, thus significantly reducing computation time as compared to direct three-dimensional segmentation.

In some example, generating the plurality of two-dimensional representations includes generating a raster render of the three-dimensional representation at each of the plurality of pose estimations. This is particularly beneficial as raster rendering is computationally much less intensive than other methods of rendering a three-dimensional representation in two-dimensions, such as ray-casting. However, in other examples any other method of rendering may be used, such as ray-casting, z buffering, or the like.

In one example, the three-dimensional representation includes a mesh. The mesh may be parameterized in any suitable manner, and typically includes a plurality of vertices and a plurality of faces. Beneficially, a mesh can simplify computational processing, for example, in relation to three-dimensional graphics. In the preferred embodiment, the faces are defined by three vertices (and three edges) and hence form a triangle face. However, this is not essential and faces may be defined by four or more vertices.

Additionally or alternatively, the method includes, in an electronic processing device determining a plurality of face references indicative of the correspondence between each two-dimensional representation and respective faces of the rendered three-dimensional representation, and generating the mapping using the face references. In this regard, the face references may be any suitable reference to the identity of the respective face in the three-dimensional representation or mesh. For example, the face reference may be a unique identifier, a reference pointer, or the like. In any event, the face references may be indicative of the faces of the three-dimensional representation which are rendered in the two-dimensional representation, and thus the ordered set of face references in the two-dimensional representation are indicative of the mapping.

In one example, the plurality of images of the scene are captured at a plurality of poses. This is particularly advantageous in generating a three-dimensional representation of the scene, as multiple images from different poses can provide increased accuracy in depth estimates, and the like. However, in other examples, the images may be captured from the same pose using stereoscopic capture devices, or the like.

In some instances, the plurality of images includes at least two adjacent images captured at different poses, both of the adjacent images being at least partially indicative of the same portion of the scene. In this regard, the images may be referred to as overlapping. Beneficially, overlapping images can increase accuracy in the generation of three-dimensional representation, as it may be easier to identify features which correspond. Accordingly, in one example the plurality of images includes a plurality of adjacent images.

In some examples, the plurality of images includes adjacent images indicative of a plurality of views of the at least one object. This can be particularly beneficial in constructing the three-dimensional representation of the object or feature of interest, in terms of, for example, increased accuracy, and increased confidence in the constructed representation.

In one example, the method includes capturing the two-dimensional images using an image capture device. In this regard, the image capture device may include any suitable device for capturing the image, such as a camera, or the like. The device may be handheld, or used in any appropriate manner, but more typically the image capture device may include an unmanned aerial vehicle. Beneficially, this reduces the cost of acquiring aerial photographs, for example, and minimizes any safety concerns, such as relating to human interactions with dangerous infrastructure.

In one example, the three-dimensional representation includes a three-dimensional reality model. In this regard, the three-dimensional model may be generated from the two-dimensional images using, for example, photogrammetry, to create a three-dimensional reality model. In some instances, the reality model is generated using the software referred to under the trade name "ContextCapture".

As will be appreciated, the object may include any suitable feature or object, including in some examples any one or more of equipment, an antenna, non-antenna equipment, a cellular phone tower, the ground, and a building. Further objects may include types of equipment, or types of antenna, such as a panel antenna, dish antenna, or the like. In other instances, such as other infrastructure scenes, objects or features may include warehouses, roads, pumping stations, or the like.

In one example, the two-dimensional segmentation includes of a probability that each pixel in the corresponding two-dimensional image is indicative of the object. For example, each pixel in the segmentation may refer to the likelihood that that pixel has captured part of the image. In some examples, this may include a mask of 1's and 0's where 1 is indicative of the object, and 0 is not. However, more typically, the segmentation includes a percentage probability per pixel, for example, 50% likely this pixel is indicative of the object.

In a particular example, the scene includes at least two objects, and the segmentation at least two probabilities per pixel, each probability corresponding to a respective object. For example, each pixel may include a list of probabilities, each probability corresponding to a different object. For example, pixel x may have a 23% probability of showing an antenna, 34% probability of a cellular tower, and 10% probability of showing the ground. This will be discussed in further detail below, for example, in relation to class probabilities.

In one example, the method includes generating a three-dimensional segmentation of the three-dimensional representation using the mapping and the two-dimensional segmentations. This may be achieved in any suitable manner, and in one example includes using the mapping to map the two-dimensional segmentations onto the three-dimensional representation. For example, the probabilities in the two-dimensional segmentations may be applied to respective faces in the three-dimensional representations, in order to create a three-dimensional segmentation. In the event more than one probability exists in relation to each face of the three-dimensional representation, the object, feature or class corresponding to the maximum probability for that face may, for example, be applied to the three-dimensional segmentation. In this regard, for a list of class probabilities, the arg-max function may be used to determine the classification of a face in the three-dimensional segmentation. However, this is just an example, and other methods may be used to generate the three-dimensional segmentation.

Additionally or alternatively, the method may include determining at least one object parameter and recognising the at least one object in the scene using the at least one object parameter. In this regard, the object parameter may be indicative of any suitable parameter relating to the object or feature include any one or more of a position of the object, an orientation of the object, a size of the object, connectivity of objects; and, a distance between objects.

In one example, the method includes generating the three-dimensional segmentation using the object parameter, two-dimensional segmentations and mapping. For instance, when determining the three-dimensional segmentation, the size, position, configuration, adjacency, connectivity, or distance of the object may be used together with the probabilities defined in the two-dimensional segmentations in order to generate a classification for each face in the three-dimensional representation. For example, if a face is mapped to a two-dimensional segmentation which indicates it has a high probability of capturing an object, but a position of the face is incongruous with the object, it may be not be included in the three-dimensional segmentation of the object. This is beneficial, as it decreases the number of outliers and mis-classified faces.

In one example, the method uses a face, or a set of faces, to determine face parameters indicative of the object parameters, and compares the face parameters to the object parameters. The three-dimensional segmentation is then generated based upon the results of the comparison. In this regard, physical configuration can, for example, be taken into account when generating the three-dimensional segmentation. For instance, the size of a set of faces which are notionally classified as an object, can be compared to the known size of an object, in order to refine or create the three-dimensional segmentation. As a further example, proximity of faces of one classification to faces of another may be used to refine the three-dimensional segmentation.

In terms of connectivity of objects, in one example, the method may include determining the connectivity between faces or the set of faces and/or the connectivity among a set of faces, compare this to the corresponding object parameter, and using the results of the comparison in generating the three-dimensional segmentation. In some examples, connectivity of faces may be determined using graph theory, network flow problems, or the like. For instance, a face connected to a set of faces classified as the object, may have a low class probability, but may be included in the segmentation in view of its connectivity to the set.

Object parameters may be determined in any suitable manner, including accepting input from a user, retrieving from a store, or adapted via machine learning, or the like.

The segmentation may include, in some examples, supervised segmentation, unsupervised segmentation, and/or semi-supervised segmentation. In this regard, two-dimensional segmentation may be performed in any suitable method, including using edge detection, snakes, active contours, classifiers, templates, or the like. More typically the method includes performing the segmentation using a supervised segmentation algorithm, and in one example a classifier. Most typically, the supervised segmentation algorithm includes a neural network.

In one particular example, the supervised segmentation algorithm includes a deep, feed-forward neural network, such as a convolution neural network (CNN). In this regard, the CNN may be trained on two-dimensional images which have been previously segmented. Advantageously, CNNs can require less pre-processing compared to other forms of neural networks, and thus be less reliant on prior knowledge.

In the event a supervised segmentation algorithm, or classifier, is used, it may be trained in any suitable manner. Therefore, in one example, the method may include training the segmentation algorithm.

In this regard, for example, the method may include determining a plurality of two-dimensional training images of a training scene, the training images at least partially including at least one training object, wherein the training object is indicative of the at least one object. The method further includes determining a plurality of training pose estimations corresponding to each of the two-dimensional training images. A three-dimensional training representation of the training scene are generated using the images. The method further includes segmenting the three-dimensional training representation to recognise the training object. Typically, this is performed manually, in order to produce the training data. The manual segmentations in this regard may be performed by a subject matter expert, however this is not essential.

Additionally, the method includes generating a plurality of two-dimensional segmented representations of the three-dimensional segmentation, and training the segmentation algorithm using the plurality of two-dimensional images and segmented representations. This is particularly beneficial, as it provides a plurality of training images and corresponding segmentations when only a single three-dimensional image is segmented (either manually or semi-automatically). This reduces the burden on a user to produce segmentations for training, as well as speeds up the training process.

Additionally or alternatively, the method includes generating a three-dimensional mesh of the at least one object using the mapping, the two-dimensional segmentations and the three-dimensional representation. In some examples, a separate three-dimensional mesh may be created for each object segmented, and in a further example, separate three dimensional meshes may be created for each instance of an object within the same class of objects.

In some example, the includes post-processing the three-dimensional mesh. Post-processing may be performed in any suitable manner, and may include removing outliers from the mesh, smoothing boundaries, or the like.

Figure 2:
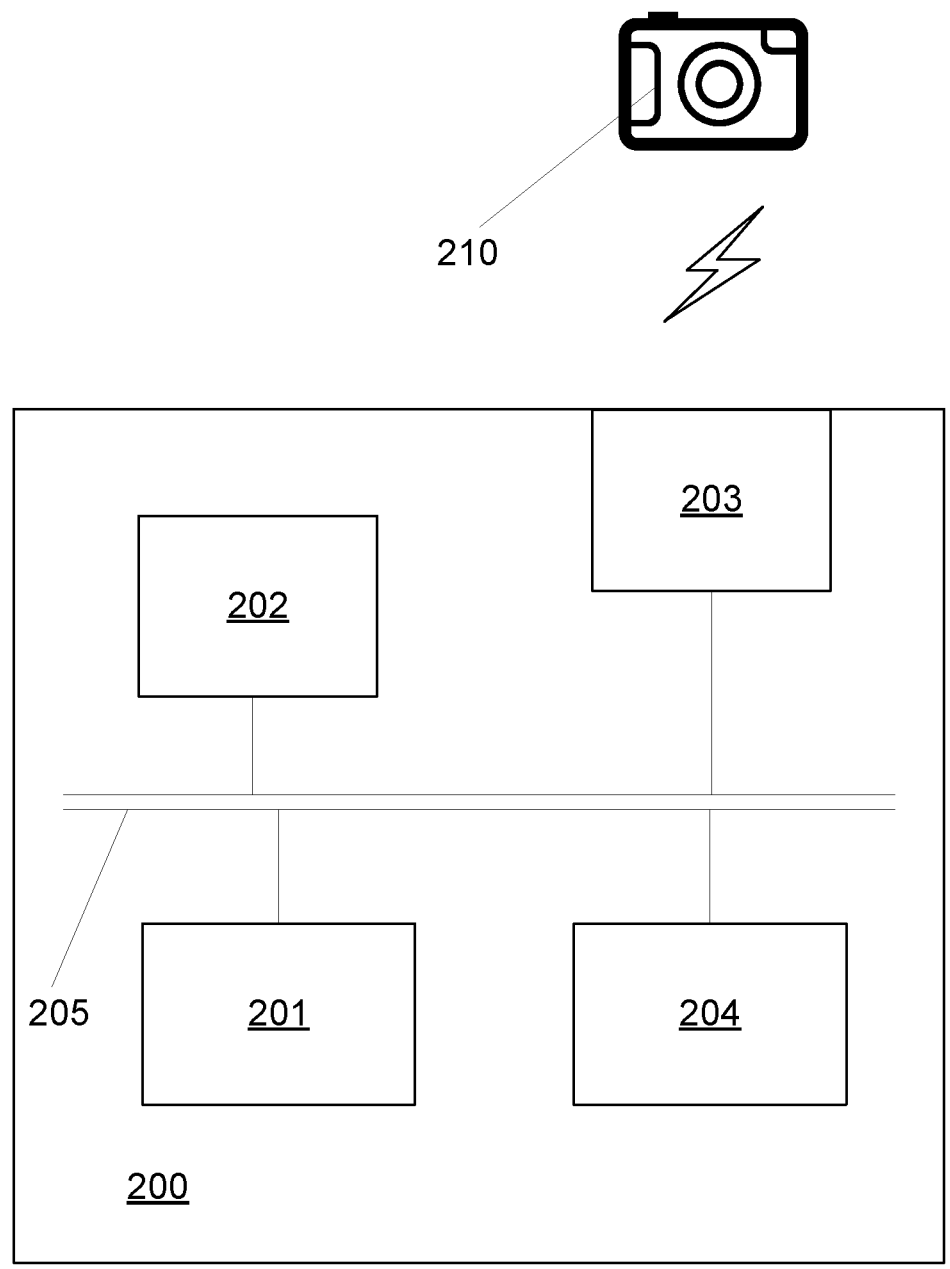
FIG. 2 is a schematic diagram of a first example of an apparatus for recognizing at least one object in a three-dimensional scene.

As shown in FIG. 2, in one example, the electronic processing system 200 includes an electronic processing device, such as at least one microprocessor 201, a memory 202, and an external interface 203, and input/output interface 204 interconnected via a bus 205, as shown. In this example, the external interface 203 can be utilized for connecting the processing system 200 to peripheral devices, such as communications networks, wireless communication connections, databases, other storage devices, image capture device(s) 210, or the like. Although a single external interface 203 is shown, this is for the purpose of example only, and in practice multiple interfaces using various methods (e.g. Ethernet, serial, USB, wireless or the like) may be provided.

Moreover, communication networks may be of any appropriate form, such as the Internet and/or a number of local area networks (LANs) and provides connectivity between the processing system 200 and other the processing systems, such as a remote electronic processing device associated with an image capture device, or remote scene or infrastructure site, or the like. It will however be appreciated that this configuration is for the purpose of example only, and in practice the processing systems can communicate via any appropriate mechanism, such as via wired or wireless connections, including, but not limited to mobile networks, private networks, such as an 802.11 networks, the Internet, LANs, WANs, or the like, as well as via direct or point-to-point connections, such as Bluetooth, or the like.

In use, the microprocessor 201 executes instructions in the form of applications software stored in the memory 202 to perform required processes, for example, to allow communication with other processing systems. Thus, actions performed by the electronic processing device 200 are performed by the processor 201 in accordance with instructions stored as applications software in the memory 202 and/or input commands received via the communications network. The applications software may include one or more software modules, and may be executed in a suitable execution environment, such as an operating system environment, or the like.

Accordingly, it will be appreciated that the electronic processing device 200 may be formed from any suitable processing system, such as a suitably programmed PC, Internet terminal, lap-top, hand-held PC, smart phone, PDA, tablet, or the like. Thus, in one example, the processing system 200 is a standard processing system, such as a 32-bit or 64-bit Intel Architecture based processing system, which executes software applications stored on non-volatile (e.g., hard disk) storage, although this is not essential. However, it will also be understood that the processing systems 200 can be any electronic processing device, such as a microprocessor, microchip processor, logic gate configuration, firmware optionally associated with implementing logic, such as an FPGA (Field Programmable Gate Array), or any other electronic device, system or arrangement.

Whilst a single processing system 200 is shown in this example, it will be appreciated that functions may be split among multiple processing systems 200 in geographically separate locations, and in some examples may be performed by distributed networks of processing systems 200 and/or processing systems provided as part of a cloud-based architecture and/or environment.

Figure 3A:
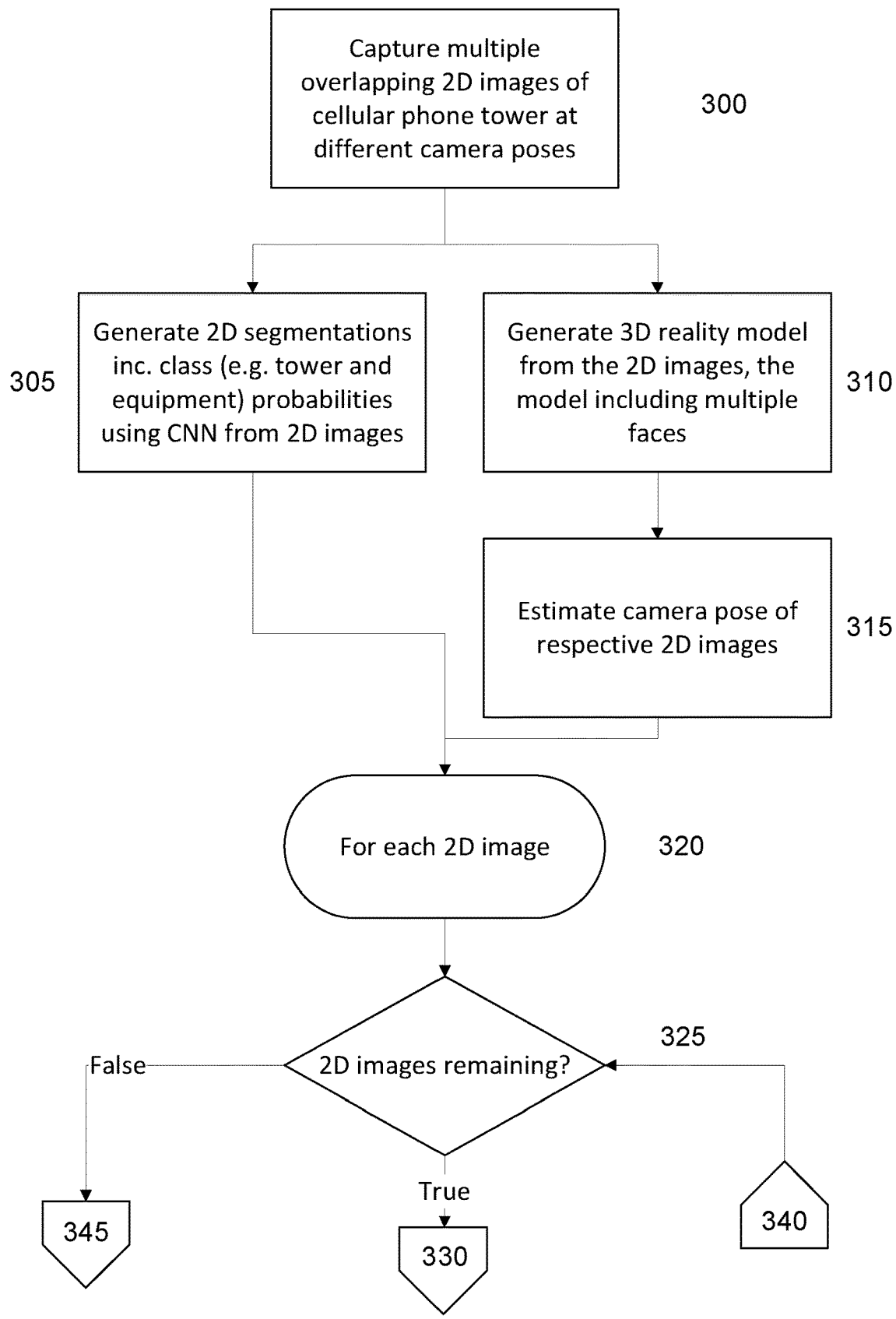
FIGS. 3A, 3B and 3C are flowcharts of a second example of a method for recognizing at least one object in a three-dimensional scene.
Figure 3B:
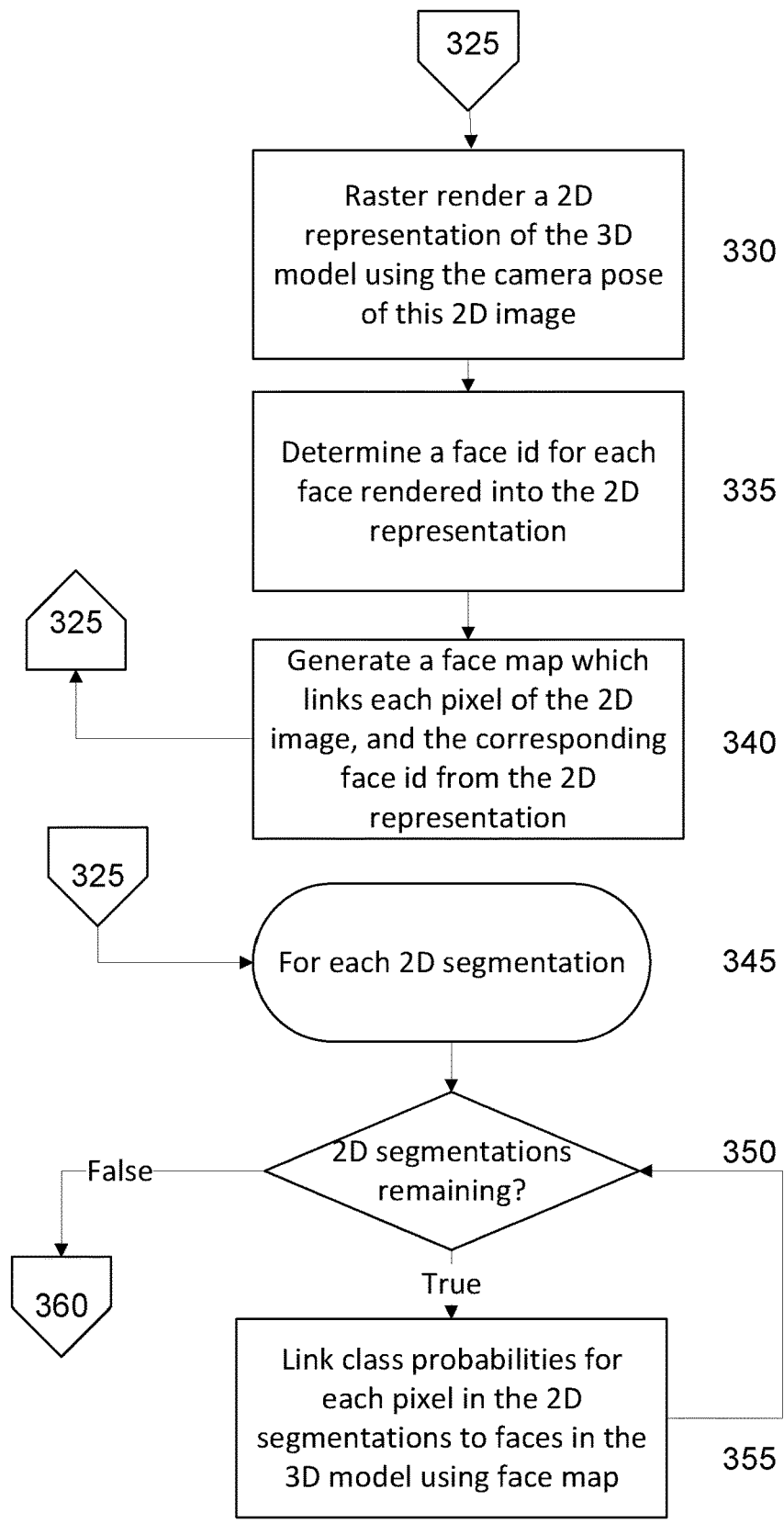
Figure 3C:
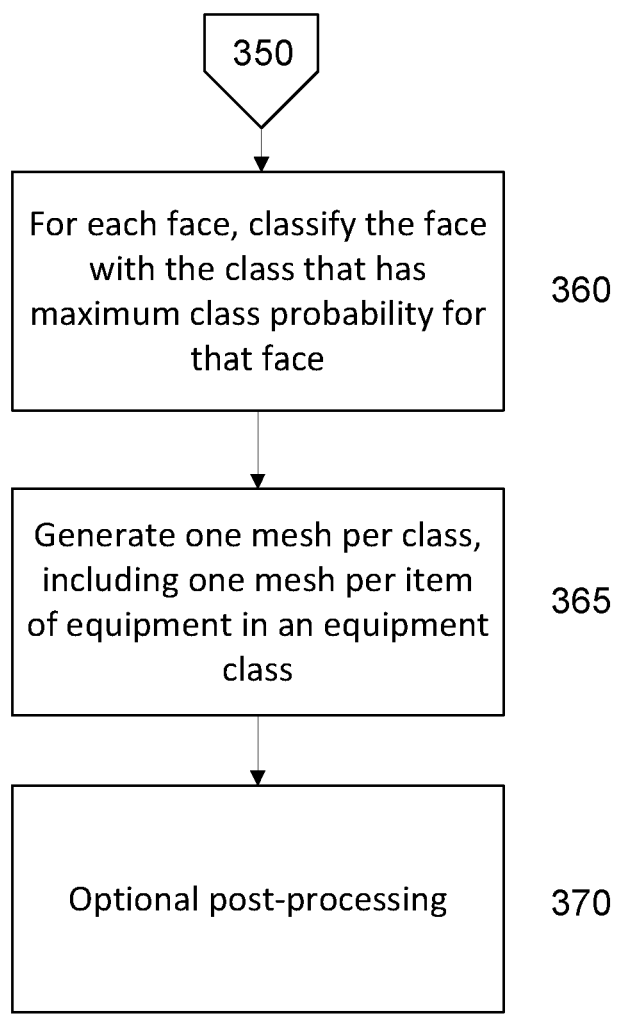

A further example of a method for recognizing at least one object in a three-dimensional scene will now be described with reference to FIGS. 3A to 3C. This example relates to the recognition of equipment and infrastructure features on a cellular (or mobile) phone tower, telecommunications tower, or the like. This is for example only, and in other examples any suitable feature or object relating to a site, scene or similar may be recognized. For example, other sites may include processing or manufacturing plants, distribution centres, ports or transportation hubs, mining or resource acquisition sites, building sites, infrastructure sites, and the like. Sites and/or scenes may be internal or external, for example, in other instances the site may include an internal scene of a warehouse, plant or the like.

In this example, the method is performed by an electronic processing device, including any of the example devices described herein.

At step 300 the method includes, in an electronic processing device, the method includes capturing multiple overlapping two-dimensional images of cellular phone towers at different camera poses.

At step 305, 2D segmentations are generated from the 2D images. In this example, this is achieved using a CNN. In this regard, the CNN has been trained on manually segmented 2D images, in order to recognize objects or classes of objects such as a tower, tower post, antennas, non-antenna equipment, etc. Accordingly, the 2D segmentations include, for each pixel in an image a list of probabilities of the pixel corresponding to a respective list of classes/objects (also referred to as "class probabilities"). For example, if segmenting antennas and non-antenna equipment, the segmentation may refer to an image pixel having a 55% chance of showing an antenna, and a 15% change of showing non-antenna equipment.

At step 310, a 3D reality model is generated from the 2D images. In particular, photogrammetry is used to construct a 3D reality model from the 2D images. The 3D reality model in this example includes a mesh comprising a plurality of vertices and faces, where a face is a triangle defined by three vertices.

At step 315, the camera pose of each 2D image is estimated. Typically, this estimate occurs as part of the photogrammetry process. For example, photogrammetry may segment features of interest from overlapping 2D images, register the features of interest, and use this to estimate the pose of the camera corresponding to each 2D image. The 3D reality model may then be constructed from the estimated pose, features of interest and 2D images.

Steps 305, 310 and 315 may be performed in any suitable order, and in this example, step 305 can be performed in parallel to 310 and 315, as shown. However, in other situations, these steps may be performed sequentially.

For each 2D image, at step 320, while more 2D images remain to be processed (step 325), a 2D raster rendered representation of the 3D reality model is generated using the corresponding estimated camera pose for that 2D image. As will be appreciated, the 2D raster rendered representation is therefore an approximation of the corresponding 2D image, but rendered from the 3D reality model (rather than from reality—as is the case with the 2D image).

A face id for each face of the reality model rendered in the 2D raster rendered representation is determined, as step 335. This may be achieved in any suitable manner, and in some instances this step is performed as part of the raster render process, for example, by acquiring the face id of each face as it is selected for render in the respective 2D representation. A face map is a mapping associated with each pixel in each 2D image, which maps that 2D image pixel to a face id on the 3D reality model. The face map is generated at step 340, and this is typically achieved during the raster render process, for example, by retrieving a two-dimensional matrix of face ids from the render function. In this respect, the two-dimensional matrix is the same size as the corresponding 2D image, with each location in the matrix corresponding to a pixel in the 2D image. Additionally, a face id in a matrix location means the corresponding 2D pixel maps to that respective face id in the reality model.

With a face map generated in respect of each 2D image, step 345 of the method proceeds for each 2D segmentation. While 2D segmentations are remaining (step 350), the class probabilities for each 2D segmentations are mapped onto faces of the 3D reality model using the corresponding face maps, at step 355. That is, for each 2D segmentation, the corresponding face-map is determined. For each pixel in the 2D segmentation, the corresponding matrix location in the respective face map provides a face id. The pairing of the class probabilities associated with that pixel of the 2D segmentation, and the face id associated with a face of the 3D reality model, allows the class probabilities to be applied to the 3D reality model.

Once completed for each segmentation, at step 360, each face in the 3D reality model is classified using the associated class probabilities. In this example, this includes labelling each face with the class that has the maximum probability (for example arg-max).

At step 365, separate meshes are generated for each class, using the labelled 3D reality model. This includes generating one mesh per item of equipment in an equipment class. For example, for an "antenna" class, there may be multiple antennas on the phone tower. Therefore, while a mesh corresponding to "antenna" could include multiple antennas, in step 365, separate meshes are generated according to each antenna.

Optionally, at step 370, the method includes post-processing. This may include, for example, removing outliers from each mesh, smoothing mesh boundaries, or the like.

Figure 4:
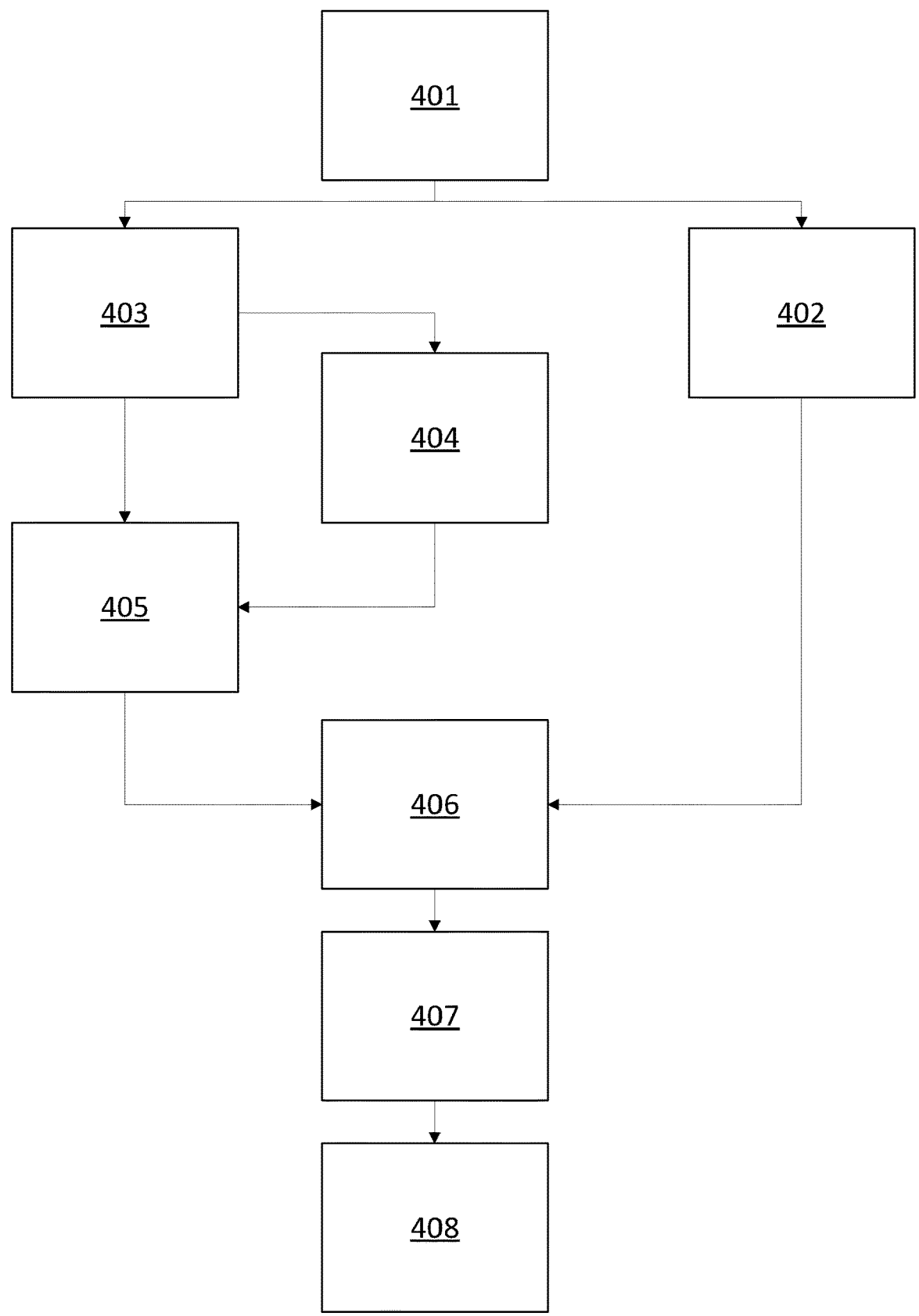
FIG. 4 is a data flow diagram of an example of dataflow in an apparatus for recognizing at least one object in a three-dimensional scene.

An example of dataflow in an apparatus for recognizing one or more objects in a three-dimensional scene will now be described with reference to FIG. 4.

In this example, a plurality of 2D images 401 are used to generate a 3D reality model 403. The 3D reality model includes a mesh comprised of vertices and faces. This is typically achieved using photogrammetry, which in some instances relies upon the 2D images 401 being captured from multiple different poses, and where the 2D images 401 overlap. Accordingly, one or more features of interest in each 2D image 401 are identified, and these are registered in order to estimate the 2D image pose 404 of each 2D image 401, and generate the 3D reality model 403.

A face map 405 is generated in respect of each 2D image 401 using the 3D reality model 403 and 2D pose estimates 404. In this example, for each 2D pose estimate 404 a 2D representation of the 3D reality model 403 from that 2D pose estimate 404 is generated using raster rendering. In this regard, each 2D representation is an estimate (based on the 3D reality model) of a corresponding 2D image 401. The correspondence between the 2D representation and its 2D image 401 equivalent thus provides a mapping between faces of the 3D reality model 403 and respective pixels in the 2D image 401. Thus, the face map 405 for a 2D image 401, is a matrix (or 2D array) which defines the face identifiers of the faces of the reality model 403 which are rendered into the corresponding 2D representation at the same pose.

Sequentially or in parallel, the 2D images 401 are also used to generate respective 2D segmentations 402. In this regard, the 2D segmentations 402 define, locate or delineate the objects or features of interest in respective 2D images 401. As discussed above, while any 2D segmentation technique or method may be used, in this example the 2D segmentation is performed using a CNN, with the result being a list of probabilities (e.g. class probabilities), each probability corresponding to the likelihood that the pixel captures a particular class of object.

A face classification 406 is created using the face mappings 405 and 2D segmentations 402. In this example, for each 2D segmentation 402, the corresponding face map 405 is used to map the class probabilities of the segmentation 402 to the faces on the 3D reality model 403.

The mesh segmentation 407 determines a single class for each face in the reality model using the face classification 406. In this example, this is achieved by classifying each face with the class corresponding to the maximum class probability (that is, arg-max).

The segmentation classification 408 uses the mesh segmentation 407, such that the mesh segmentation 407 is separated into separate meshes for each class of object, namely, mesh segmentation 407. In some instances, this also includes having mesh segmentations 407 for each object of the same class (for example, if there are multiple antenna, there may be one mesh per instance of antenna). This may be achieved, for example, by analyzing the face-adjacency of similarly classified faces, and grouping faces of the same classification using a proximity measure.

Figure 5:
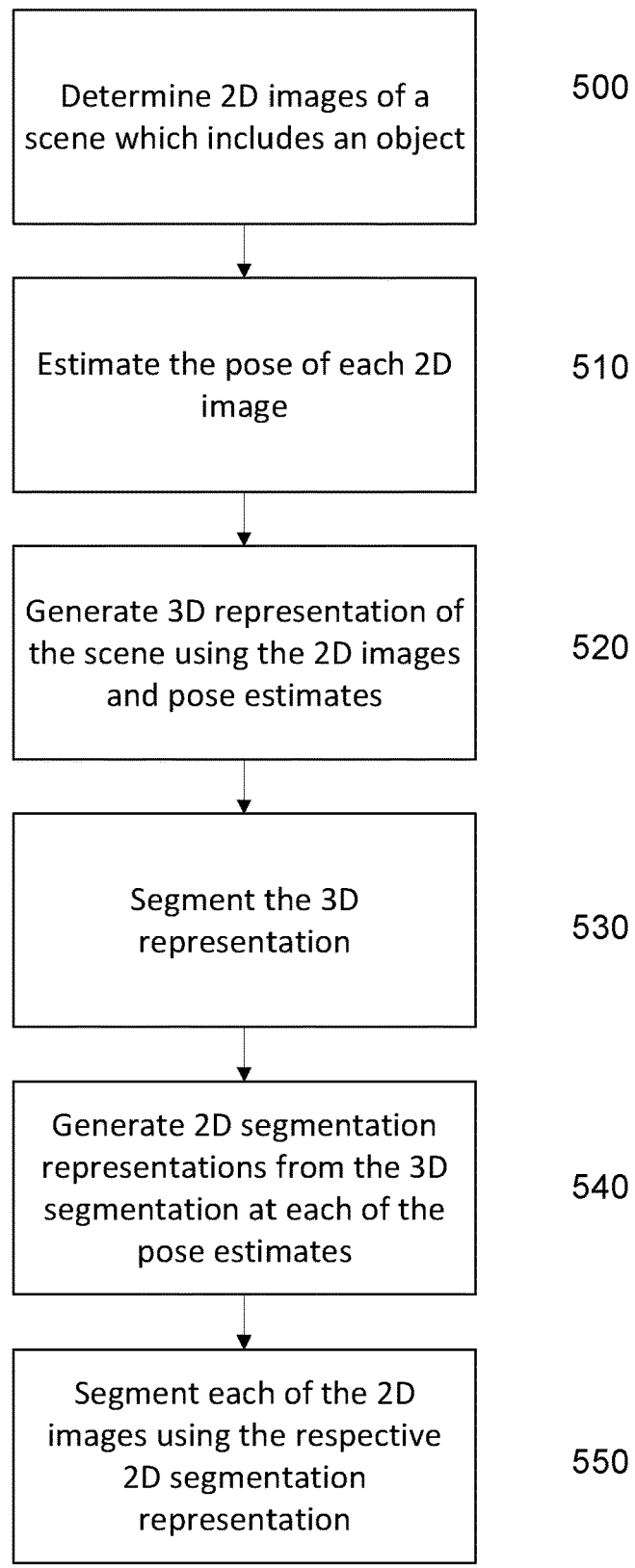
FIG. 5 is a flowchart of an example of a method for generating two-dimensional segmentations from a plurality of two-dimensional images.

An example of a method for generating two-dimensional segmentations from a plurality of two-dimensional images will now be described with reference to FIG. 5. In this example, the method is performed by an electronic processing device, including any of the example devices described herein.

The method for generating two-dimensional segmentations which will now be described is particularly useful, for example, in generating multiple segmentations from a single manual segmentation. Advantageously, this can provide a large training set of data for a segmentation classifier, such as the CNN described above, or any other suitable classifier, supervised learning algorithm, machine learning algorithm or the like. Accordingly, the set of training segmentations are generated with minimal user intervention, as only a single manual segmentation is required, as will now be described.

At step 500, the method includes, in the electronic processing device, determining 2D images of a scene which includes an object. As mentioned above, this may be achieved in any suitable manner, and typically includes capturing a series of images of a scene from multiple different poses while ensuring at least some of the images overlap.

The pose of each 2D image is estimated at step S10. This step includes estimating the pose of the capture device (e.g. camera), such as position and orientation, corresponding to the 2D image. This can be achieved in any suitable manner, such as identifying common features between images and registering the common features in order to estimate the image pose. While this may be performed independently of step S20, alternatively, step S10 and step S20 are performed together.

At step S20, the method includes generating a 3D representation of the scene using the 2D images and pose estimates. In this regard, the 3D representation may include generating a 3D reality model, such as described above, the model being defined by a mesh including vertices and faces.

The 3D representation is segmented at step S30. In this example, the segmentation is performed at least partially manually, and in the preferred embodiment, substantially or all manually. In some examples, the manual segmentation is performed using a subject matter expert, with experience in the field relating to the scene and/or object.

At step S40, the method includes generating 2D segmentation representations from the 3D segmentation at each of the pose estimates. This may be performed in any suitable manner, and in one example includes raster rendering a 2D segmentation representation of the 3D segmentation at each pose estimate. In other examples, the representation may be generating using one or more of ray casting, generating a projection, or the like.

Each of the 2D images is segmented at step S50 using the respective 2D segmentation representation. Thus, the 2D segmentation representations correspond to a segmentation of respective 2D images. Accordingly, the 2D segmentations can be used, for example, to train a classifier, such as the CNN described herein.

An example of a three-dimensional representation, such as a mesh, will now be described with reference to FIG. 6A. In this example, the mesh 600 is an example of a 3D representation, such as described in any of the examples herein. The representation 600 includes a plurality of vertices and faces 601, 602, where each face is defined by four vertices. While each face is a pentagon in this example, more typically, the mesh 600 includes triangular faces 601, 602, where each face is defined by three vertices. In other examples, any suitable number of vertices may define a face.

Figure 7:
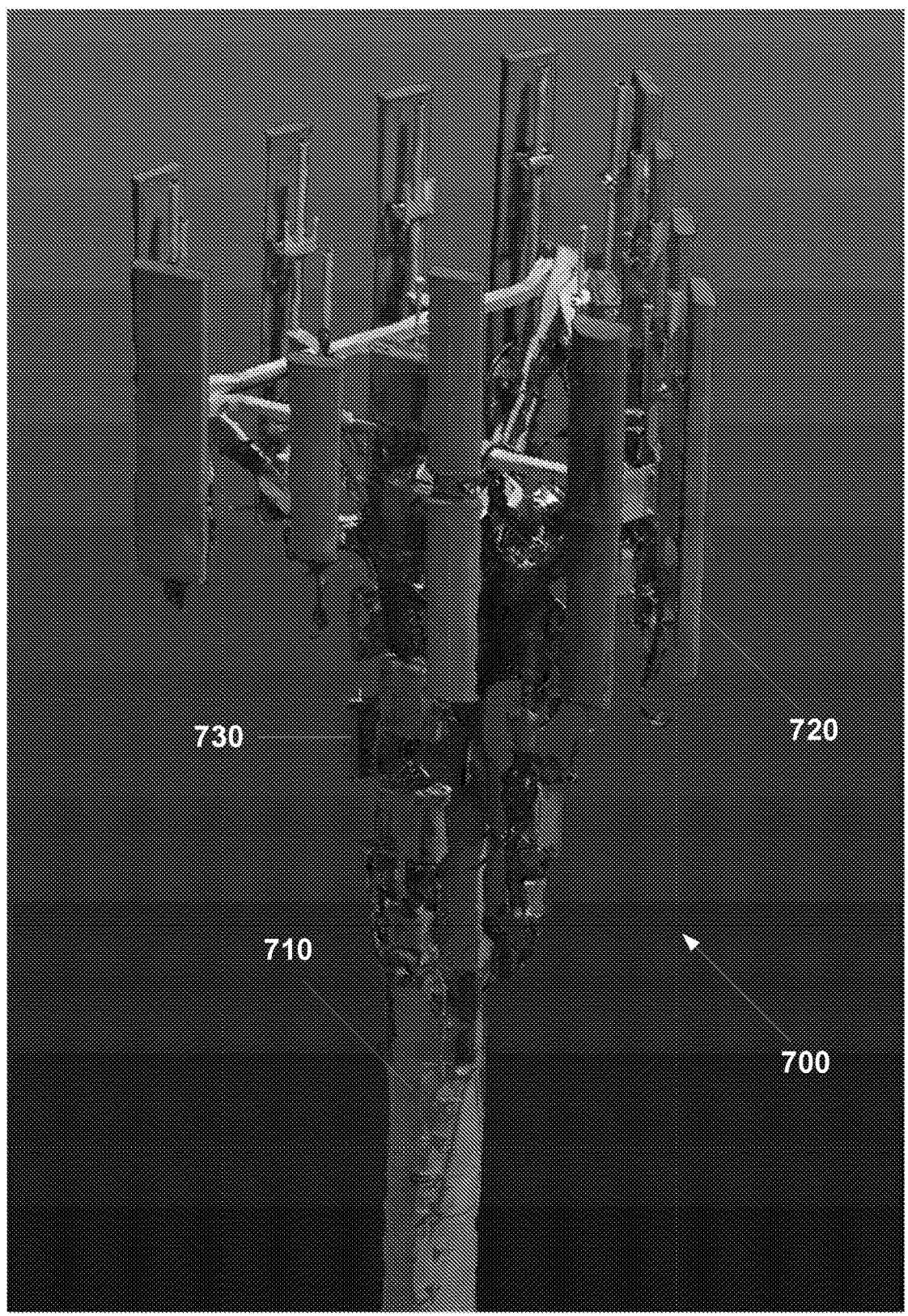

An example of a two-dimensional representation will now be described with reference to FIG. 6B. In this example, the two-dimensional representation 610 has been generated from the 3D representation of FIG. 6A, such as at step 120 of the method shown in FIG. 1. Accordingly, a mapping (or face map) corresponding to the 2D representation 610 may include the following matrix (or 2D array) which shows the mapping between the 2D representation and faces 601 and 602:

row 1: null, null, null, null
row 2: . . . , . . . , . . . , 601
row 3: . . . , 606, . . . , . . .
row 4: . . . , . . . , . . . , null An example of a three-dimensional segmentation of a scene will now be described with reference to FIG. 7. In this example, the 3D segmentation 700 includes three meshes including a cellphone tower 710, panel antennas 720, and dish antenna 730. This segmentation was generating using the method described above in FIG. 3. Advantageously, by performing the 2D segmentations on 2D images, and then using a raster render function to map the 2D segmentations to a 3D reality model, it is possible to produce a 3D segmentation utilizing much less computational power than directly performing a 3D segmentation. Example: Method for recognizing equipment on a cellular phone tower In this example, an automated process for auditing equipment on real-world infrastructure will be described. In particular, the infrastructure in this example includes a cellular phone tower.

Terminology in this example includes:
Site: the area in the physical world we are interested in, eg cell phone tower and immediate surroundings
Reconstruction: the process of turning multiple photos of a site into a mesh Mesh: a 3D object consisting of vertices and faces
Vertex: a point in space, a corner of a face
Face: a triangle connecting 3 of the mesh vertices
Segment: a subset of the mesh
Class: a classification for a mesh segment, such as "building", "dish" or "ground"
Render: objects (meshes, in our case) stored in computer memory converted to an image, displayed or used for analysis
Image Pose: contains capture geometry information, such as camera location and orientation at time of capture, camera intrinsic, etc The method in this example includes a multistage workflow, including the following steps which are outlined below in greater detail:

1. 2D Images: Capturing 2D images of the assets with a UAV or manually.
2. 3D Model: A reality model is reconstructed from these 2D images.
3. 2D Segmentation: The Image segmentation is also performed on the 2D images to identify the objects.
4. Generate Face-map: Create a face-map of each 2D image, to determine where each pixel of the image is mapped to a 3D face on the 3D model.
5. Face Classification: Apply the face-map to the 2D segmented images.
6. Produce the segmented 3D mesh.
7. Grow the 3D mesh segments to be neat.

Site mesh segmentation allows analysis of specific parts of the 3D mesh, such as panel and dish antennas, other tower equipment, and the tower itself, thus providing value in the reconstructed mesh. This analysis includes equipment location and orientation, and can also include equipment make/model, condition and emitted radiation estimation.

The technique of this example allows for 3D segmentation of the 3D model using the 2D source image pose, 2D segmentation followed by a 2D to 3D mapping processing.

In particular, the following inputs to the method include:
Segmentation result: can be 2D array (class for each pixel) or 3D array (probability of each class for each pixel)
2D Image pose
Site mesh to be segmented The following process therefore assumes 2D segmentation has already been acquired. This can be performed, for example, using a deep CNN, edge detection or other suitable 2D segmentation technique.

Generate Face-Map

Figure 6A:
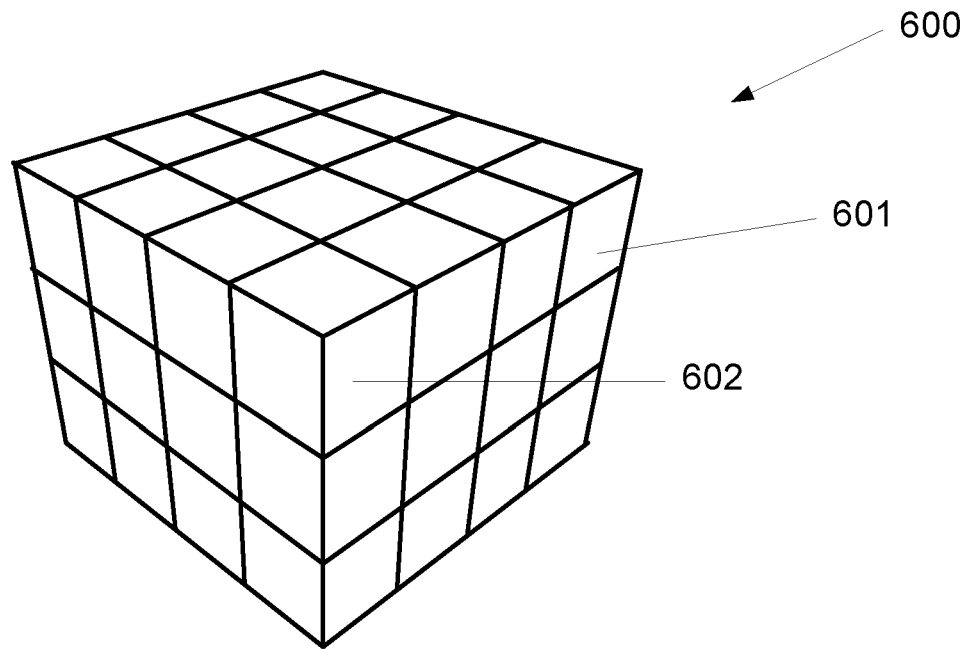
FIG. 6A is a schematic diagram of an example of a three-dimensional mesh.
Figure 6B:
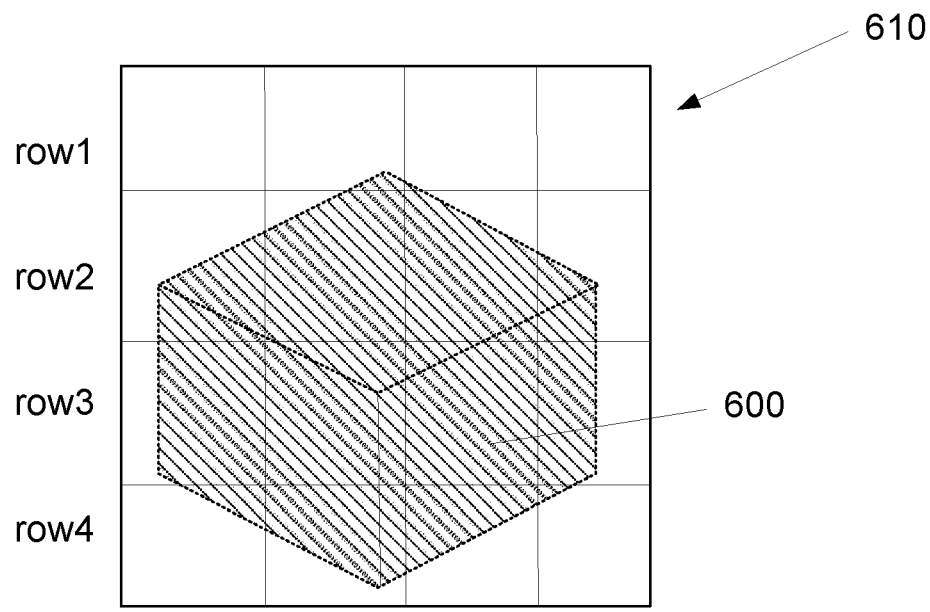
FIG. 6B is a schematic diagram of an example of a two-dimensional representation; and, FIG. 7 is an example of a three-dimensional segmentation of a scene.

The face-map is a 2D array that directly relates a pixel in an image to the corresponding face in the mesh, for example, as shown in relation to FIGS. 6A and 6B and as discussed above.

Using the camera projection or pose estimation, a virtual view is created for each captured photo. This view is used to raster render the mesh to recreate an estimate of the original image, but as a face-map. This render results in a 2D array with the value of each pixel indicating the id of the face seen by that pixel.

The benefit of this method is significant computational optimisation and performance improvement realized using a rending process, as opposed to, for example, ray-casting.

Face Classification

For each image that has been captured at the site and processed in the deep CNN, for every pixel in that image, we apply the class probabilities for that pixel, giving us a total of the probabilities for each class for each face.

Mesh Segmentation

For each face, the face is classified using the class probabilities and a weight arg-max function. All the faces for a given class is extracted separately (that is, segmentation).

Segments Processing

For the equipment classes (currently panel antennas, dish antennas and non-antenna equipment), these are further split up by face-adjacency and recombined by the proximity of their bounding-boxes, with the goal of having one mesh segment per item of equipment on the tower. In one example this is achieved using an open-source algorithm implemented in an application programming interface (API) or library referred to under the name "Trimesh". Trimesh is an open-source Python library providing methods for analysis and manipulation of 3D meshes: https://github.com/mikedh/trimesh.

Each mesh typically contains the entirety of the represented object, and none of the surrounding mesh. This is achieved in this example by applying some clean-up, such as removing loose faces, reclassifying incorrectly classified pole tower, and removing equipment that is not on the pole tower.

Accordingly, the abovementioned examples describe a method, apparatus and system for recognising objects in a three-dimensional scene, and in one particular example, for recognising assets (such as equipment) on a cellular phone tower for the purposes of asset management and audit. Beneficially, the apparatus and method provide an optimization of computational resourcing, thus increasing computational speed. Moreover, in some examples, the computational efficiency means fewer two-dimensional images are required, thus reducing image capture requirements, energy consumption and the like.

Throughout this specification and the claims which follow, unless the context request otherwise, the word "comprise", and variations such as "comprises" and "comprising", will be understood to imply the inclusion of a stated integer or step or group of integers of steps but not to the exclusion of any other integer or step or group of integers.

Persons skilled in the art will appreciate that numerous variations and modifications will become apparent. All such variations and modifications which become apparent to persons skilled in the art, should be considered to fall within the spirit and scope that the invention broadly appearing before described.

Thus, for example, it will be appreciated that features from different examples above may be used interchangeably where appropriate.

The invention claimed is:

1. A method for recognizing at least one object in a three-dimensional scene, the method including performing the following steps in an electronic processing device:
    determining a plurality of two-dimensional images of the scene, the images at least partially including the at least one object;
    determining a plurality of two-dimensional segmentations of the at least one object, the two-dimensional segmentations corresponding to the two-dimensional images;
    generating a three-dimensional representation of the scene using the images;
    determining a pose estimation for each of the two-dimensional images;
    generating a plurality of two-dimensional representations of the three-dimensional representation using the pose estimations, each two-dimensional representation corresponding to a respective two-dimensional image;

generating a mapping using the two-dimensional representations, the mapping being indicative of a correspondence between the images and the representation; and using the mapping to map the plurality of segmentations to the three-dimensional representation, to thereby recognize the at least one object in the scene;

wherein each of the two-dimensional segmentations includes of a probability that each pixel in the corresponding two-dimensional image is indicative of the object and wherein the scene includes at least two objects, and the two-dimensional segmentation at least two probabilities per pixel, each probability corresponding to a respective object.

2. A method according to claim 1, wherein generating the plurality of two-dimensional representations includes generating a raster render of the three-dimensional representation at each of the plurality of pose estimations.

3. A method according to claim 1, wherein the three-dimensional representation includes a mesh, and wherein the mesh includes a plurality of vertices and a plurality of faces.

4. A method according to claim 1, wherein the method includes, in an electronic processing device:
determining a plurality of face references indicative of the correspondence between each two-dimensional representation and respective faces of the rendered three-dimensional representation; and,
generating the mapping using the face references.

5. A method according to claim 1, wherein the plurality of images of the scene are captured at a plurality of poses, wherein the plurality of images includes at least two adjacent images captured at different poses, both of the adjacent images being at least partially indicative of the same portion of the scene.

6. A method according to claim 1, wherein the plurality of images includes a plurality of adjacent images, and wherein the plurality of images includes adjacent images indicative of a plurality of views of the at least one object.

7. A method according to claim 6, wherein the method includes capturing the two-dimensional images using an image capture device, and wherein the image capture device includes an unmanned aerial vehicle.

8. A method according to claim 1, wherein the three-dimensional representation includes a three-dimensional reality model.

9. A method according to claim 1, wherein the at least one object includes at least one of:
equipment;
an antenna;
non-antenna equipment;
a cellular phone tower;
ground; or
a building.

10. A method according to claim 1, wherein the method includes, in an electronic processing device, generating a three-dimensional segmentation of the three-dimensional representation using the mapping and the two-dimensional segmentations.

11. A method according to claim 1, wherein the method includes, in an electronic processing device:
determining at least one object parameter; and,
recognizing the at least one object in the scene using the at least one object parameter, and wherein the at least one object parameter is indicative of at least one of:
a position of the object;
an orientation of the object;
a size of the object;
connectivity of objects; or,
a distance between objects.

12. A method according to claim 1, wherein the segmentation includes at least one of supervised segmentation, unsupervised segmentation, or semi-supervised segmentation, and wherein the method includes, in an electronic processing device, performing the segmentation using a supervised segmentation algorithm.

13. A method according to claim 12, wherein the supervised segmentation algorithm includes a neural network, or wherein the supervised segmentation algorithm includes a convolution neural network (CNN).

14. A method according to claim 12, wherein the method includes, in an electronic processing device, training the segmentation algorithm.

15. A method according to claim 14, wherein the method includes, in an electronic processing device:
determining a plurality of two-dimensional training images of a training scene, the training images at least partially including at least one training object, wherein the training object is indicative of the at least one object;
determining a plurality of training pose estimations corresponding to each of the two-dimensional training images;
generating a three-dimensional training representation of the training scene using the images;
segmenting the three-dimensional training representation to recognize the training object;
generating a plurality of two-dimensional segmented representations of the three-dimensional segmentation; and,
training the segmentation algorithm using the plurality of two-dimensional images and segmented representations.

16. A method according to claim 1, wherein the method includes, in an electronic processing device:
generating a three-dimensional mesh of the at least one object using the mapping, the two-dimensional segmentations and the three-dimensional representation, and wherein the method includes, in an electronic processing device post-processing the three-dimensional mesh.

17. A method according to claim 1 for training a supervised segmentation algorithm for recognizing at least one object in a scene, the method including, in an electronic processing device:
determining a plurality of two-dimensional training images of a training scene, the training images at least partially including at least one training object, wherein the training object is indicative of the at least one object;
determining a plurality of training pose estimations corresponding to each of the two-dimensional training images;
generating a three-dimensional training representation of the training scene using the images;
segmenting the three-dimensional training representation to recognize the training object;
generating a plurality of two-dimensional segmented representations of the three-dimensional segmentation; and,
training the segmentation algorithm using the plurality of two-dimensional images and segmented representations.

18. An apparatus for recognizing at least one object in a three-dimensional scene, the apparatus including an electronic processing device that:
- determines a plurality of two-dimensional images of the scene, the images at least partially including the at least one object;
- determines a plurality of two-dimensional segmentations of the at least one object, the two-dimensional segmentations corresponding to the two-dimensional images;
- generates a three-dimensional representation of the scene using the images;
- determines a pose estimation for each of the two-dimensional images;
- generates a plurality of two-dimensional representations of the three-dimensional representation using the pose estimations, each two-dimensional representation corresponding to a respective two-dimensional image;
- generates a mapping using the two-dimensional representations, the mapping being indicative of a correspondence between the images and the representation; and
- uses the mapping to map the plurality of segmentations to the three-dimensional representation, to thereby recognize the at least one object in the scene; and
- wherein each of the two-dimensional segmentations includes of a probability that each pixel in the corresponding two-dimensional image is indicative of the object and wherein the scene includes at least two objects, and the two-dimensional segmentation at least two probabilities per pixel, each probability corresponding to a respective object.

19. An object recognition system for recognizing at least one object in a three-dimensional scene, the system including:
- at least one image capture device for capturing a plurality of two-dimensional images; and, an electronic processing device that:
- determines a plurality of two-dimensional images of the scene, the images at least partially including the at least one object;
- determines a plurality of two-dimensional segmentations of the at least one object, the two-dimensional segmentations corresponding to the two-dimensional images;
- generates a three-dimensional representation of the scene using the images;
- determines a pose estimation for each of the two-dimensional images;
- generates a plurality of two-dimensional representations of the three-dimensional representation using the pose estimations, each two-dimensional representation corresponding to a respective two-dimensional image;
- generates a mapping using the two-dimensional representations, the mapping being indicative of a correspondence between the images and the representation; and
- uses the mapping to map the plurality of segmentations to the three-dimensional representation, to thereby recognize the at least one object in the scene; and
- wherein each of the two-dimensional segmentations includes of a probability that each pixel in the corresponding two-dimensional image is indicative of the object and wherein the scene includes at least two objects, and the two-dimensional segmentation at least two probabilities per pixel, each probability corresponding to a respective object.

* * * * *